(12) United States Patent
Gotthold et al.

(10) Patent No.: US 6,572,265 B1
(45) Date of Patent: Jun. 3, 2003

(54) IN SITU OPTICAL SURFACE TEMPERATURE MEASURING TECHNIQUES AND DEVICES

(75) Inventors: John P. Gotthold, Sunnyvale, CA (US); Anh N. Hoang, San Jose, CA (US); Surinder S. Sandhu, Santa Clara, CA (US); John Leonard Shaver, San Francisco, CA (US); Terry M. Stapleton, San Jose, CA (US)

(73) Assignee: Luxtron Corporation, Santa Clara, CA (US)

( * ) Notice: Subject to any disclaimer, the term of this patent is extended or adjusted under 35 U.S.C. 154(b) by 22 days.

(21) Appl. No.: 09/839,857

(22) Filed: Apr. 20, 2001

(51) Int. Cl.[7] .............. G01J 5/08; G01J 5/28; G01K 1/14; G01K 11/20; F21V 8/00; G01B 6/00

(52) U.S. Cl. .......... 374/161; 374/131; 374/208; 385/12; 385/147; 250/458.1; 250/459.1; 250/234; 250/578.1

(58) Field of Search .............. 374/120, 161, 374/141, 131, 208, 124, 132; 385/12, 147; 250/458.1, 459.1, 234, 578.1

(56) References Cited

U.S. PATENT DOCUMENTS

| | | | |
|---|---|---|---|
| 3,877,411 A | | 4/1975 | MacDonald |
| 4,448,547 A | | 5/1984 | Wickersheim |
| 4,459,046 A | | 7/1984 | Spirg |
| 4,569,570 A | | 2/1986 | Brogårdh et al. |
| 4,626,110 A | | 12/1986 | Wickersheim et al. |
| 4,652,143 A | | 3/1987 | Wickersheim et al. |
| 4,750,139 A | | 6/1988 | Dils |
| 4,752,141 A | | 6/1988 | Sun et al. |
| 4,986,671 A | | 1/1991 | Sun et al. |
| 5,183,338 A | | 2/1993 | Wickersheim et al. |
| 5,294,200 A | * | 3/1994 | Rall .................. 374/120 |
| 5,315,092 A | | 5/1994 | Takahashi et al. |
| 5,433,525 A | * | 7/1995 | El-Ibiary .................. 374/141 |
| 5,556,204 A | * | 9/1996 | Tamura et al. .............. 374/161 |
| 5,775,808 A | | 7/1998 | Pan |
| 5,791,782 A | * | 8/1998 | Wooten et al. .............. 374/208 |
| 5,893,643 A | * | 4/1999 | Kumar et al. .............. 374/131 |
| 6,056,433 A | * | 5/2000 | Yam .......................... 374/2 |
| 6,079,874 A | * | 6/2000 | Hegedus .................... 374/112 |
| 6,084,215 A | * | 7/2000 | Furuya et al. ............ 219/444.1 |
| 6,085,246 A | * | 7/2000 | Shufflebotham et al. .... 374/121 |
| 6,110,288 A | | 8/2000 | Penelon et al. |
| 6,140,612 A | * | 10/2000 | Husain et al. .............. 219/390 |
| 6,179,466 B1 | * | 1/2001 | Peuse et al. ................. 374/128 |
| 6,183,130 B1 | | 2/2001 | Adams et al. |
| 6,231,230 B1 | * | 5/2001 | Baldock et al. ............. 374/208 |
| 6,353,210 B1 | * | 3/2002 | Norrbakhsh et al. ........ 219/497 |

FOREIGN PATENT DOCUMENTS

| | | |
|---|---|---|
| JP | 6-112303 | 4/1994 |
| JP | 7-151606 | 6/1995 |
| JP | 9-297072 | 11/1997 |
| JP | 2000-81355 | 3/2000 |
| WO | WO 00/03216 | 1/2000 |
| WO | WO 01/36916 A2 | 5/2001 |

* cited by examiner

*Primary Examiner*—Diego Gutierrez
*Assistant Examiner*—Gail Verbitsky
(74) *Attorney, Agent, or Firm*—Parsons Hsue & de Puntz LLP (57) ABSTRACT

A temperature sensor utilizing optical temperature measuring techniques is constructed to make firm contact with a surface whose temperature is being measured, an example application being the monitoring of semiconductor wafers or flat panel displays while being processed. A cap is mounted near but spaced apart from an end of a lightwave guide, with a resilient element that applies force of the cap against a surface whose temperature is being measured as the cap is urged toward the optical fiber end. An optical temperature sensing element, such as luminescent material or a surface of known emissivity, is carried within the cap. A bellows with a closed end conveniently serves as both the cap and the resilient element. An alternative temperature measuring device installs an optical temperature sensing material within a test substrate behind an optical window, and then views the sensing material through the window.

36 Claims, 5 Drawing Sheets

FIG._14
*(Section A-A)*

FIG._15

IN SITU OPTICAL SURFACE TEMPERATURE MEASURING TECHNIQUES AND DEVICES

FIELD OF THE INVENTION

This invention relates generally to optical temperature measuring techniques, and, more specifically, to devices and techniques for measuring the temperature of a surface of an article by contacting its surface during processing.

BACKGROUND OF THE INVENTION

There has been a great deal written about various optical temperature measuring techniques, both in patents and the technical literature, as well as many commercial products utilizing this technology. In one aspect of this technology, a luminescent material is used as a temperature sensor because certain aspects of its luminescence are temperature dependent. Typically in the form of a sensor at the end of a fiber optic cable, the luminescent material is excited to luminescence by sending excitation radiation of one wavelength to the sensor through the optical fiber, and the resulting luminescence at a different wavelength is photo-detected after passing back along the optical fiber. The detected signal is then processed to determine the temperature of the luminescent material in the sensor. Basic concepts of luminescent temperature sensing, as well as many different forms of sensors, are described in U.S. Pat. No. 4,448,547. The measurement of the decay time of the luminescence after termination of an excitation pulse, as a measurement of temperature, is described in U.S. Pat. No 4,652,143. Commercial products adopted the decay time measurement technique as a good measurement of temperature.

Applications of these luminescent sensor measurement techniques are numerous, including the measurement of surface temperature. U.S. Pat. No. 4,752,141 describes an elastomeric luminescent sensor at the end of an optical fiber that deforms as it is urged against a surface being measured in order to establish good thermal communication. An alternative use of a thin non-metallic disc with a layer of luminescent material between it and the end of an optical fiber is also described. One advantage and focus of luminescent temperature measurement techniques has been for applications in environments having strong electric and/or magnetic fields and the like, where metal sensors cannot be relied upon to provide accurate results since the metal is heated as a result of the field.

Another optical temperature measuring technique relies upon the infrared emissions of a black-body sensor, or one having the characteristics of a black-body. An example of such a system, generally used to measure higher temperatures than measured with luminescent sensors, is described in U.S. Pat. No. 4,750,139. The sensor is a black-body emitter formed at the end of an optical fiber. U.S. Pat. No. 5,183,338 describes several forms of a fiber optic sensor that includes both luminescent and black-body temperature measuring elements. Each of the foregoing identified patents is expressly incorporated herein in its entirety by this reference.

There are also many other optical temperature sensing techniques that have been described in patents and the literature, as well as being used commercially. But the luminescent and black-body techniques have generally been preferred over those others.

SUMMARY OF THE INVENTION

Briefly, an optical temperature sensor is formed on an end of an optical radiation wave guide, such as an optical fiber, which may use a luminescent, black-body or other existing optical temperature sensitive material, in a form especially adapted for measuring the temperature of a surface, particularly, by way of example, a surface of a semiconductor wafer, flat panel display or other substrate being processed within a processing chamber. A rigid support for the temperature sensitive material, such as a cap in which the material is held on an inside, is positioned adjacent the wave guide end with a space normally between them. A resilient element urges the cap away from the wave guide end, at least in response to the cap being pushed toward the wave guide end when the sensor being brought into contact with the surface being measured. This provides very close contact with the surface, resulting in good thermal transfer and equilibrium between the surface and the temperature sensitive material. There are several useful forms of the temperature sensitive material support and resilient element, which may be formed as one or made separate. One specific form uses a closed end bellows element that both provides a cap having the temperature sensitive material on its inside and the resilient element in its side walls, the optical fiber being inserted into the bellows from an open end.

The sensors of the present invention have application in a number of different environments, including very hostile environments. Sensors of the present invention operate within a chamber having a high vacuum, a chemical bath chamber, environments with extreme hot or cold, or those with high levels of radio frequency, microwave or other electromagnetic radiation bands.

A primary reason for wanting to know the temperature of a substrate being processed is to allow its temperature to be set or varied as desired by making suitable adjustments to the processing equipment. According to another aspect of the present invention, instead of measuring the temperature of the actual substrates being processed, however, a test substrate or other object being processed is provided with at least one optical temperature sensor formed in a surface of the substrate. The test substrate is then periodically or occasionally positioned in the processing chamber in place of an actual substrate being processed, during which time the processing equipment is calibrated to provide the desired substrate temperature during processing. Such a sensor preferably includes optical temperature sensing material imbedded into a small area of the surface behind a protective transparent window. The sensor is viewed by directing optical radiation through the window.

Additional aspects, features and advantages of the present invention are included in the following description of exemplary embodiments thereof, which description should be taken in conjunction with the accompanying drawings.

DESCRIPTION OF EXEMPLARY EMBODIMENTS

The surface temperature techniques and sensors of the present invention may be used in a wide variety of environments and applications. The temperature of surfaces on any of a large number of types of objects may be measured. These measurements can be made while the object is being subjected to some processing where knowledge of the temperature of its surface is desired, or otherwise. The example application described herein is the measurement of the temperature of the surface of substrates during one or more steps of processing to form integrated circuits and/or visual display elements such as liquid display devices (LCDs) thereon. The substrate is either a semiconductor wafer or that of a flat panel display, in the examples described.

Figure 1:
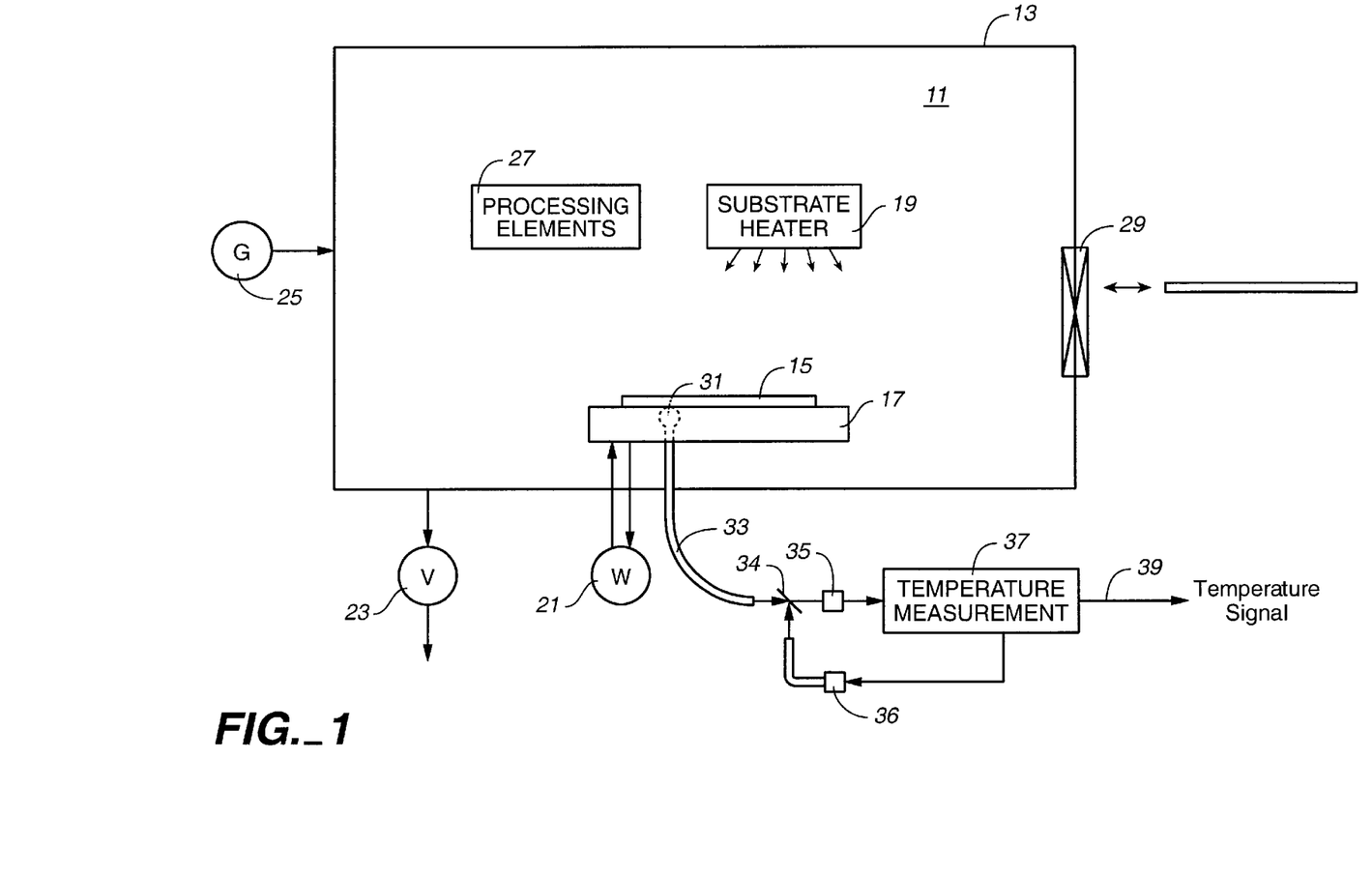
FIG. 1 is a general schematic diagram that shows a processing chamber in which temperature sensor of the present invention may be used.

Referring to FIG. 1, a general vacuum processing chamber 11 formed by an enclosure 13 is schematically illustrated. A substrate 15 being processed within the chamber is supported horizontally or vertically by a structure appropriate for the substrate and type of processing, the support in this case being a chuck 17 upon which the substrate rests in a horizontal position. The substrate 15 is typically heated in some fashion, a radiant heater 19 being shown. In some processes, the chuck 17 is cooled by circulation of water or some other coolant through it from an outside water supply 21 that includes refrigeration to cool the water. A vacuum pump 23 lowers the pressure within the chamber 11. Many processes involve the introduction of one or more gasses into the chamber 11, an external supply 25 of such gas(es) being shown. Specific processing elements 27 within the chamber 11 vary depending upon the process being performed. Chemical vapor deposition (CVD) and physical vapor deposition (PVD), such as sputtering and vaporization, are among the processes wherein the temperature measurement techniques of the present invention have application. Substrates are loaded into and unloaded from the chamber 11 through a load lock 29.

In the example of FIG. 1, the chuck 17 is provided with a temperature sensor 31 that contacts an underside of the substrate 15, when lying on the chuck, to measure the temperature of the contacted surface. An optical signal of the sensor 31 is coupled to a photodetector 35 by an optical communication medium 33 which can be a wave guide in the form of an optical fiber, other form of light pipe or a hollow wave guide. An electrical signal output of the photodetector 35 is received by a measuring circuit card or instrument 37 to provide an output signal 39 of the measured temperature. This signal can be used for a number of purposes, such as to drive an indicator (not shown) that provides a human operator with the temperature information that enables he or she to make adjustments to the heater 19 or other aspects of the processing. Alternatively, the signal 39 can be used by a control system (not shown) of the processing chamber in a feedback loop to control the heater 19 or other processing element.

The optical temperature measuring element of the sensor 31 may be a luminescent material that has some aspect of its excited electrical radiation highly temperature dependent. Measurement of the decaying characteristics of the luminescent radiation output signal is usually preferred, as described in the patents discussed in the Background section above. When a luminescent sensor is employed, an excitation source 36 and beam splitter 34 are added to the configuration of FIG. 1. An alternative sensor element is a non-luminescent surface of known emissivity that emits electromagnetic radiation with a magnitude proportional to its temperature, as previously described. Other potential optical temperature measuring techniques include monitoring the frequency of the band edge of a semiconductor element, the absorption of incident radiation by an element of temperature dependent transmission and the color of a material that changes with temperature.

Figure 2:
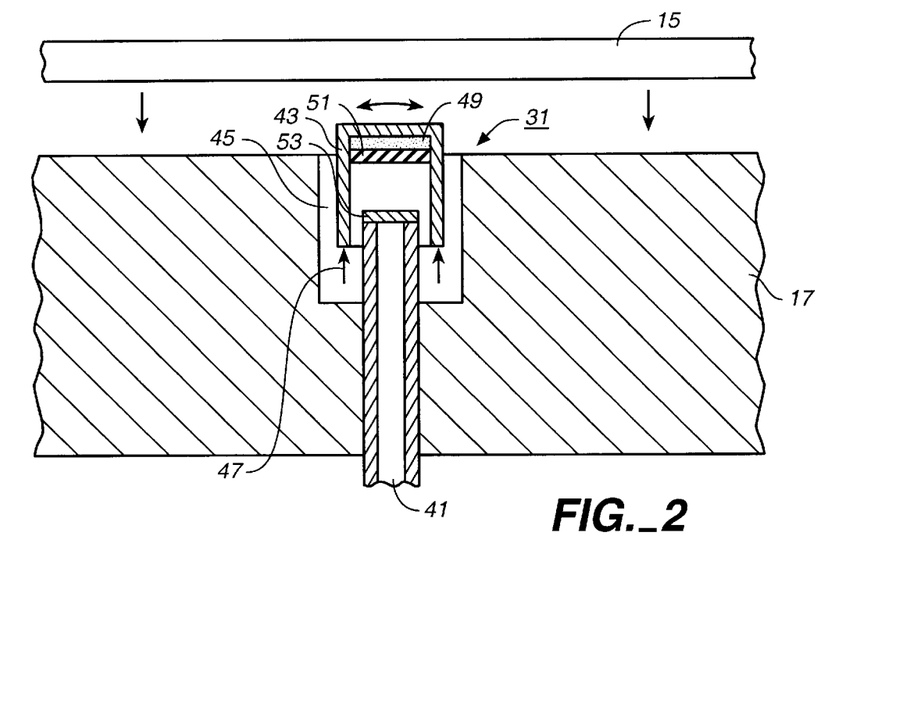
FIG. 2 is a cross-sectional view of a general form of a surface temperature sensor.
Figure 3:
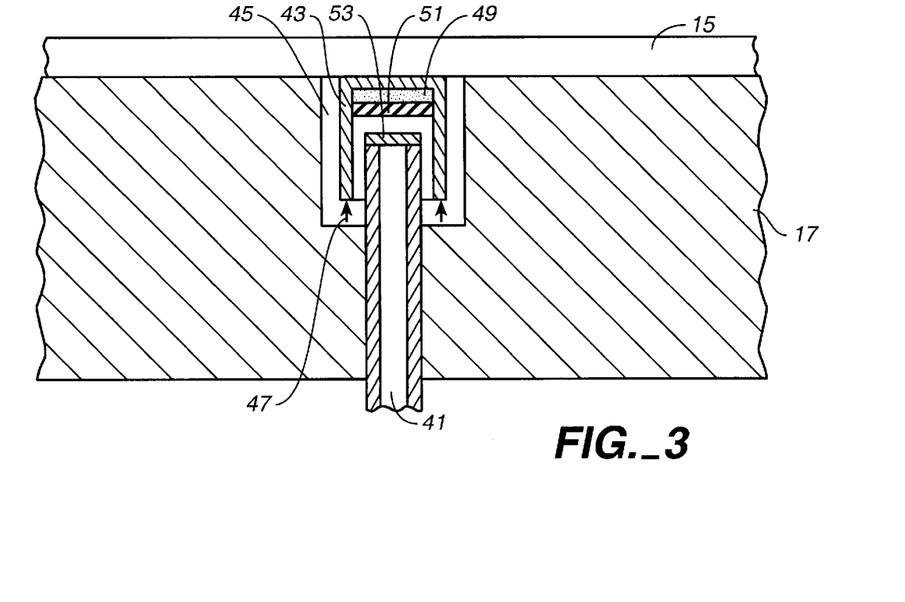
FIG. 3 shows the temperature sensor of FIG. 2 in contact with a surface being measured.

A general form of sensor 31 is illustrated in FIGS. 2 and 3. A light wave guide 41, such as an optical fiber, other form of light pipe or hollow wave guide, is held fixed within the chuck 17. A cap 43 of material having a high degree of thermal conductivity is positioned within an aperture 45 and held by a resilient element 47 a distance away from an end of the wave guide 41. The cap 43 normally extends a short distance above the upper surface of the chuck 17, as shown in FIG. 2, but the resilient element 47 that holds the cap in that position has a strength that is matched to the weight of the substrate 15 so that the cap is urged downward into the opening 45 when the substrate 15 is laid on the chuck 17. A substrate contacting end of the cap 43 has at least a significant portion of its surface formed in a mating shape to that of the surface being measured in order to form a close contact with that surface. That shape in this case is planar. The cap 43 is also allowed to rotate within some limit with respect to the fixed wave guide in order to facilitate its mating surface being orientated in close contact with the substrate surface as the substrate is lowered onto the chuck 17.

The cap 43 may be made of a very thin heat conducting metal, such as nickel, whose substrate contacting end does not deform in shape during normal use. In this general example, the cap 43 has a cylindrical shape in plan view, a cross-sectional side view being shown in FIGS. 2 and 3. In addition to serving to contact the substrate, the cap 43 is a carrier of the optical temperature sensing element. In FIGS. 2 and 3, this element is a layer 49 of luminescent material that is attached to an inside surface of the cap 43. An optically transparent cover 51 is usually used to seal the luminescent material layer 49 from out-gassing that can result from use in a very low pressure chamber. Gasses escaping from the luminescent material can interfere with the processing. The cover 51 may be made from sapphire, for example, since it is a very stable and inert material. Similarly, a sapphire cover 53 may be attached to the end of the wave guide 41 to prevent out-gassing of the wave guide materials. However, if the wave guide is itself made of sapphire, this is not necessary. Although the cap form of the carrier for the luminescent material is preferred, alternate carrier shapes are also possible.

Four different specific embodiments of the sensor generally shown and described with respect to FIGS. 2 and 3, are shown in FIGS. 4–8, wherein the same reference numbers are used for corresponding elements. Each sensor is shown in the form of a cartridge having an outer housing 55 with an outside shape that is suitable for its intended application. The entire unit is then inserted into a mating aperture of the chuck 17 or other element in which it is installed. The outside shape of the housing 55, and thus the mating aperture of the chuck 17, can be cylindrical (as shown), square or any other suitable shape. The housing preferably has an outwardly extending flange 57 that positions the sensor within the chuck in an axial direction.

Figure 4:
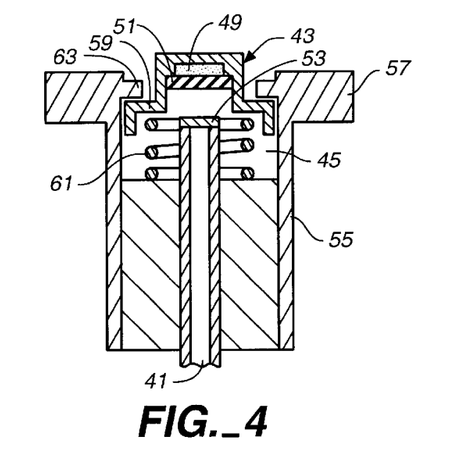
FIG. 4 is a cross-sectional view of a first specific example surface temperature sensor.

In the embodiment of FIG. 4, the cap 43 is shaped to provide a ledge 59 against which a spring 61 (the resilient element 47) urges the cap upward. That same ledge also abuts a ledge 63 around the opening in the housing 57 through which the cap 43 extends, thereby constraining maximum movement of the cap 43 out of the housing. When the substrate 15 pushes against the end surface of the cap 43, the cap is pushed downward into the opening 45 against the force of the spring 61. In order to make sure that the cover 51 does not touch the end cover 53 of the optical fiber when the cover is pushed into the opening by the weight of a substrate, and thus limit its travel, the distances are made sufficient so that this does not occur. A void exists between the covers 51 and 53 at all times.

Figure 5:
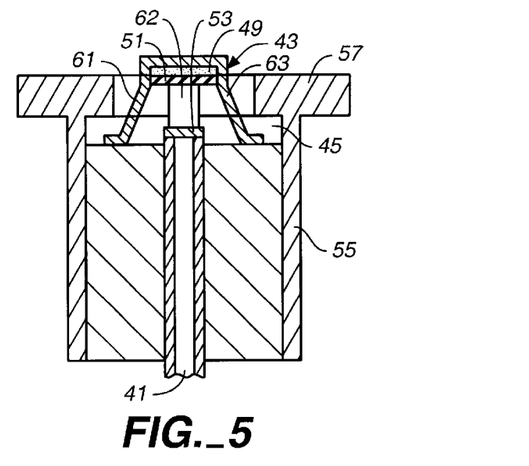
FIG. 5 is a cross-sectional view of a second specific example surface temperature sensor.

A difference with the embodiment of FIG. 5 is that the resilient element is formed as part of the cap. The cap 43, instead of cylindrically shaped side walls, includes integral fingers 61, 62 and 63 that bend to cause their lower terminations to spread horizontally as the cap is pushed downward into the opening 45 when urged against a substrate surface. When not pushed downward, these fingers 61, 62 and 63 hold the surface contacting end of the cap 43 above the upper surface of the housing flange 57.

Figure 6:
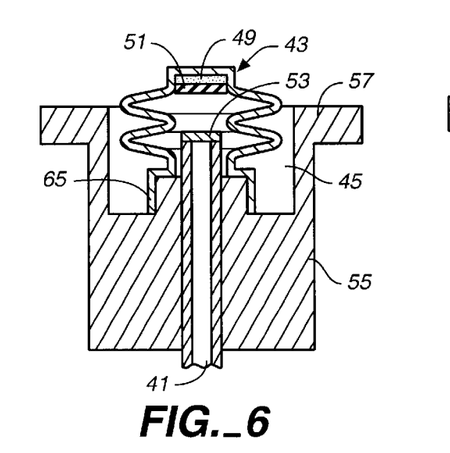
FIG. 6 is a cross-sectional view of a third specific example surface temperature sensor.

The embodiment of FIG. 6 also uses a cap that has the resilient element formed in its side walls. In this case, the side walls are a bellows that allows the exposed end of the cap 43 to be pushed into the opening 45. An end 65 of the integral cap structure is conveniently made to fit onto a mating boss formed as part of the housing 55. The two mating surfaces may be held together by a layer of glue between them. The shape of the mating surfaces may be cylindrical (as shown), square or any other shape that is suitable for a particular application. The end of the wave guide thus extends into the interior of the bellows, again with space between the wave guide and the inside of the cap being maintained even when the cap is pushed downward by contact with the surface being measured. Such an open end bellows cap element, made of nickel, that is suitable for this application is available from Servometer Company. The housing 55 is preferably machined or molded as a single piece from polyamide-imide, this material being available from the General Electric Company. When the cap 43 is of a unitary, gas impermeable structure, and its open end is sealed to the housing 55, the covers 51 and 53 may be omitted.

Figure 7:
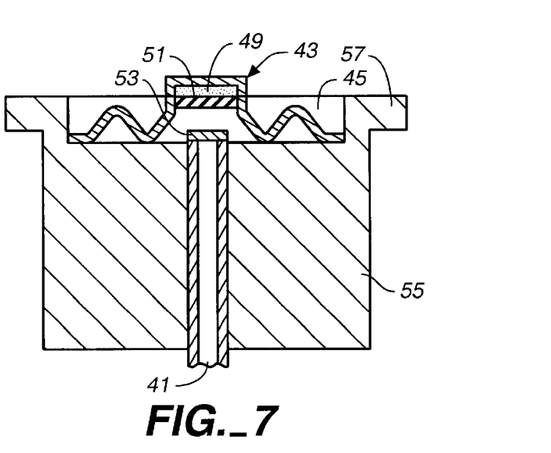
FIG. 7 is a cross-sectional view of a fourth specific example surface temperature sensor.

In the embodiment of FIG. 7, the fingers of the embodiment of FIG. 5 are extended substantially horizontally and provided with folds similar to those of the bellows in the embodiment of FIG. 6. The ends of these fingers are attached by glue to the housing 55. As the top surface of the cap is pushed downward, as with the bellows of the FIG. 6 embodiment, the folds of the fingers move closer together but return to their uncompressed state shown in the drawings when that force is removed from the cap.

Figure 8:
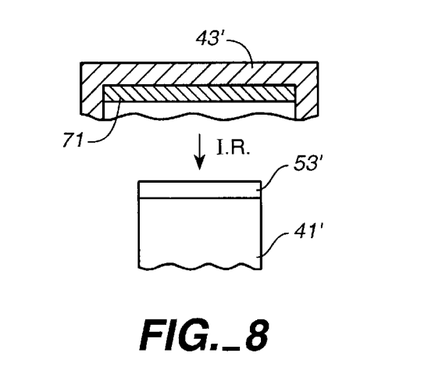
FIG. 8 illustrates a modification of any of the temperature sensors of FIGS. 2–7 to include a first form of an infrared emitter as the temperature sensor.
Figure 9:
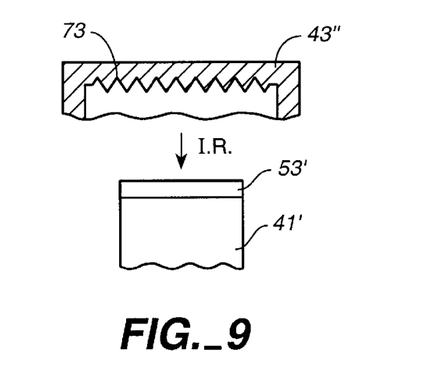
FIG. 9 illustrates a modification of any of the temperature sensors of FIGS. 2–7 to include a second form of an infrared emitter as the temperature sensor.

FIGS. 8 and 9 show a modification of the sensors of FIGS. 2–7 where a blackbody surface is substituted for the luminescent material layer 49 as the temperature sensor. This is desirable when the range of temperatures being measured is higher than that which can be measured by luminescent materials. In FIG. 8, a layer 71 of material of a known, controlled surface emissivity is applied to an inside surface of an end of the cap 43'. This emissivity is preferably made to be high, in a range of 0.8 to 1.0, where 1.0 is the emissivity of a black body. The layer 71 can most simply be a paint that is applied to the inside of the cap. Alternatively, the layer 71 is omitted if the material of the cap 43' is selected to have a known emissivity of its surfaces that is high enough for practical use.

In the sensor of FIG. 9, the inside surface of the cap 43" is altered to include a number of cavities 73, preferably conical in shape, that simulate the emissivity of a black body. With either of the sensors of FIGS. 8 or 9, it is the intensity of emissions of the surface in the infrared range that are detected by the photo-detector 35 of FIG. 1 and measured by the system 37. The excitation source 36 and beam splitter 34 of FIG. 1 are not used. The intensity is proportional to the temperature of the surface that is emitting the infrared radiation.

Figure 10:
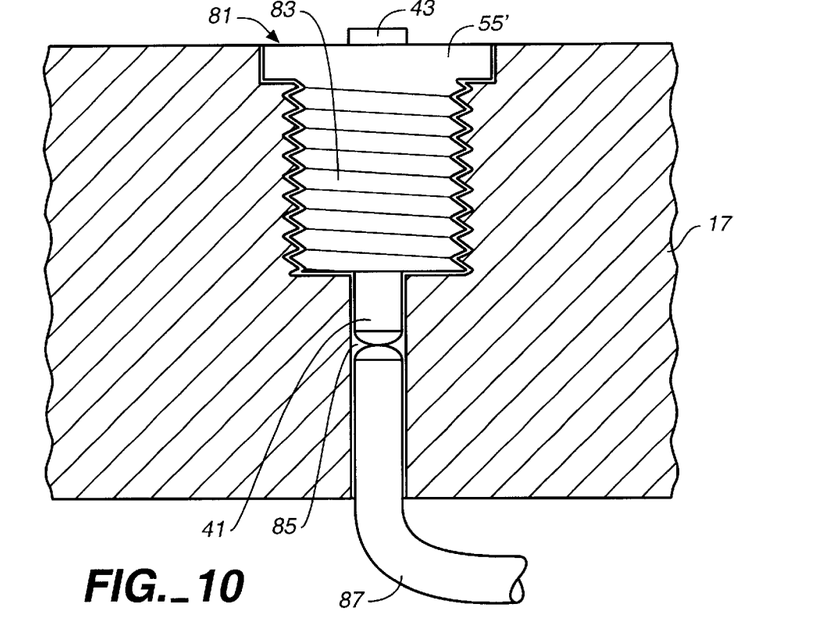
FIG. 10 shows a form of package for any of the temperature sensors of FIGS. 4–9.

A preferred form of a cartridge sensor according to any one of FIGS. 4–9 is shown in FIG. 10. A sensor 81 includes an outer housing 55' like the housing 55 of FIGS. 4–7 but with threads 83 added to a portion of an outside surface. An opening in the chuck 17 is preferably configured to be completely filled by the sensor 81 and includes threads on an inside surface that mate with the threads 83 to firmly hold the sensor 81 in place within the chuck 17. The threads are replaced with smooth mating surfaces, which are then glued together, when used within vacuum chambers in order to avoid pockets between the threads which can hold gases. Or, if threads are used in a vacuum application, the housing 55' is sealed to the chuck 17 at its top surface to prevent the escape of such trapped gases into the processing chamber. An opening 85 extends through the chuck 17 from the opening receiving the sensor 81 as a conduit for the wave guide 41. Rather than extending that wave guide continuously through the chuck 17, however, it is terminated to form a short stub extending from the bottom of the sensor 83. Another wave guide 87, preferably in the form of an optical fiber, is inserted into the opening 85 to optically communicate with the wave guide 41 and extend to the detection and measurement equipment. A lens, as shown, is attached to the mating ends of each of the wave guide 41 and optical fiber 87 in order to more efficiently couple radiation between the two. An advantage of the configuration of the sensor 81 is that it can easily be installed and replaced in the chuck 17.

Figure 11:
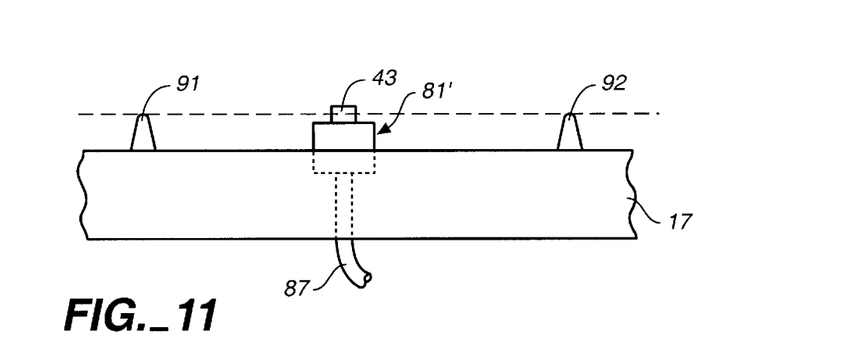
FIG. 11 shows one example use of a temperature sensor according to any of FIGS. 2–10.

The general form of the sensors described is shown in FIGS. 2 and 3 to operate with the substrate being carried directly by an upper surface of the chuck 17. The temperature sensors described above also have other applications. In FIG. 11, for example, the substrate is held above the surface of the chuck 17 by posts 91 and 92. A sensor 81', like the sensor 81 but without the upper flange, extends above the chuck surface to position the sensor cap 43 above the dashed line that represents the lower surface of the substrate 15 when carried by the posts. The cap 43 is then pushed downward by the weight of the substrate when carried by the posts 91 and 92, to make firm contact with the underside of the substrate.

Figure 12:
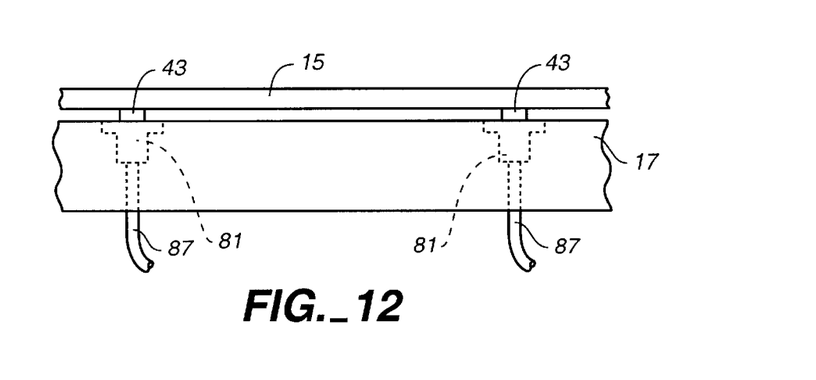
FIG. 12 shows another example use of a temperature sensor according to any of FIGS. 2–10.

FIG. 12 illustrates use of two or more sensors 81 to additionally provide support for the weight of the substrate 15. In this case, the resilient element within the sensor is made stronger than before so that the cap 43 is not pushed within the housing of the sensor. Some small degree of compression of the resilient element and rotation of the cap are desired in order to make firm thermal contact with an underside of the substrate.

Figure 13:
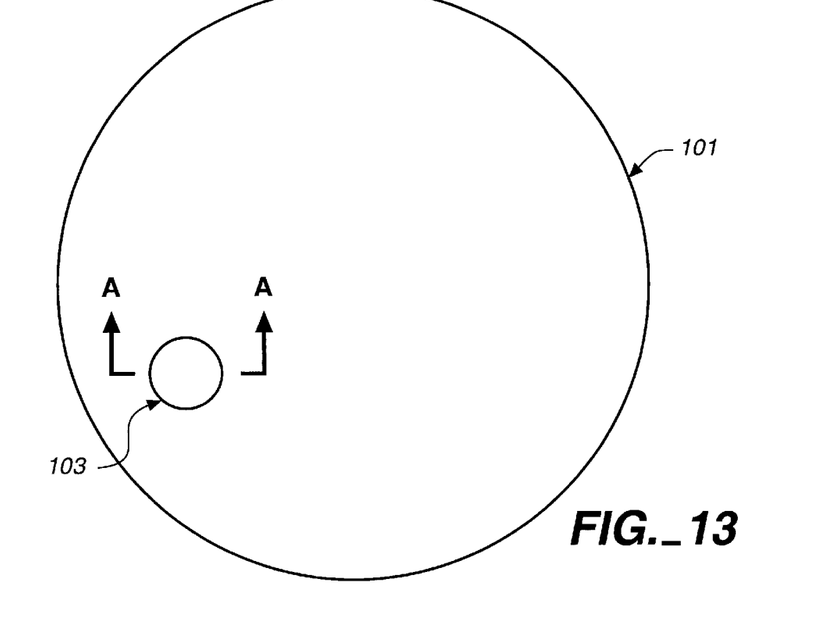
FIG. 13 illustrates a test substrate with a luminescent temperature sensor built into a surface.
Figure 14:
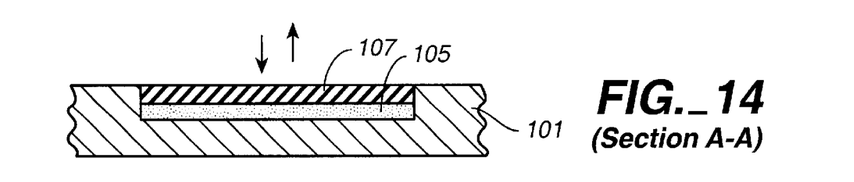
FIG. 14 is a sectional view of FIG. 13, taken at section A—A thereof.

A different form of luminescent temperature sensor is shown in FIGS. 13 and 14. A test substrate 101, preferably in the shape of a semiconductor wafer, flat panel display, or other substrate being processed, includes a temperature sensor 103 built into a substrate surface. A layer 105 of luminescent material is sealed within a recess of the substrate by an optically transparent window 107 made of an appropriate material such as sapphire. Excitation radiation is passed through the window to the luminescent material, and resulting temperature dependent luminescent radiation passes back through the window.

Figure 15:
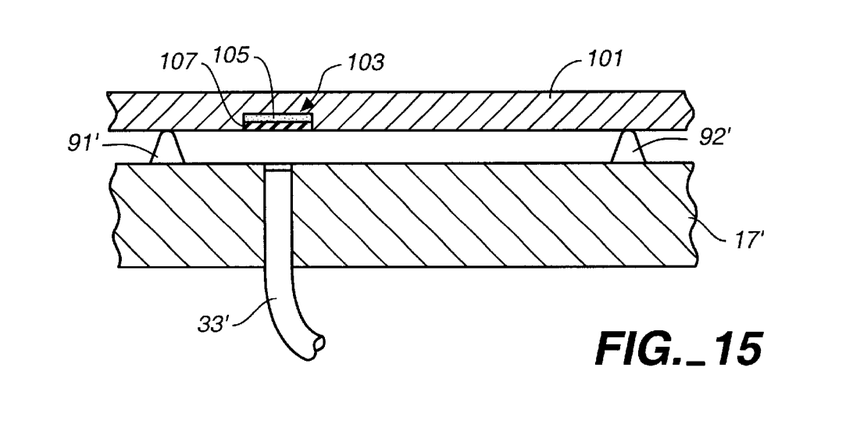
FIG. 15 shows one way of optically coupling with the substrate sensor of FIGS. 13 and 14 in order to read its temperature.

Interrogation of the sensor 103 occurs by positioning appropriate optics to communicate with it while the substrate 101 is positioned within the processing chamber 11 (FIG. 1) in the same manner as substrates that are being processed. An example is shown in FIG. 15, where the test wafer 101 is held by posts 91' and 92' above a chuck 17'. An optical fiber 33', or other appropriate wave guide, terminates in an upper surface of the chuck 17'. The sensor 103 is within the field of view of the optical fiber 33' when the test wafer 101 is properly positioned on the chuck 17'. Although use of posts 91' and 92' is shown, the wafer can be supported by the upper surface of the chuck 17' with the sensor 103 being very close to, or in contact with, the end of the optical fiber 33'. In the course of processing a large number of substrates, such a test substrate is occasionally substituted for a substrate being processed in order to occasionally calibrate the substrate heating system within the chamber.

Although the various aspects of the present invention have been described with respect to exemplary embodiments, it will be understood that the invention is to be protected within the full scope of the attached claims.

What is claimed:

1. A sensor for measuring the temperature of a surface of an object, comprising:
    a cap having a non-deformable end wall of thermally conducting material and a side wall connected thereto, an outside surface of the end wall being shaped to conform to a shape of the object surface to be measured,
    a surface on an inside of the end wall of the cap that emits electromagnetic radiation having a detectable optical characteristic that is proportional to the temperature of the cap end wall,
    a light wave guide having one end held within the cap a distance from the radiation emitting element and in optical communication therewith, and
    a resilient element connected with the cap in a manner to urge the cap outside surface away from the wave guide one end a limited distance in a manner allowing a limited degree of rotational freedom with respect to the wave guide one end, thereby causing the cap end outside surface to firmly engage the object surface when positioned in contact therewith.

2. The sensor of claim 1, wherein the resilient element includes a spring surrounding said one wave guide end that urges the cap through an opening of a housing a distance away from said one wave guide end that is limited by a stop adjacent said housing opening.

3. The sensor of claim 1, wherein the resilient element is formed as part of the cap side wall.

4. The sensor of claim 3, wherein the cap side wall includes folds that operate to exert a force on the cap end away from the wave guide one end in response to being compressed.

5. The sensor of claim 4, wherein the cap side wall folds operate in a direction substantially perpendicularly with the cap end wall outside surface.

6. The sensor of claim 4, wherein the cap side wall folds operate in a direction substantially parallel with the cap end wall outside surface.

7. The sensor of claim 4, wherein the cap end wall outside surface includes a majority thereof that is planar.

8. The sensor of claim 1, wherein the cap side wall includes the resilient element in the form of a plurality of resilient fingers oriented at an acute angle with a normal to the cap end wall outside surface and that operate to exert a force on the cap end away from the wave guide one end in response to being pushed toward said wave guide one end.

9. The sensor of claim 1, wherein the electromagnetic radiation emitting surface on the inside of the end wall includes a surface of a layer of luminescent material attached to an inside of the cap.

10. The sensor of claim 9, additionally including an optically transparent cover positioned within the cap over the layer of luminescent material.

11. The sensor of claim 1, wherein the electromagnetic radiation emitting surface on the inside of the end wall includes a surface of known emissivity that emits radiation within an infrared range.

12. The sensor of claim 11, wherein the surface of known emissivity includes an inside surface of the cap material.

13. The sensor of claim 1, additionally including a housing with an opening in one end thereof through which the cap end wall outside surface protrudes in a manner that the cap may be pushed through the housing opening against the force of the resilient element.

14. The sensor of claim 13, wherein the housing includes an attachment device on an outside surface thereof for removable insertion of the housing into an opening of a support plate, and said wave guide extending through an end of the housing opposite to said one end and terminating a distance from said opposite end in a manner enabling coupling of the wave guide termination to an end of an optical fiber.

15. A temperature measuring sensor, comprising:
    a housing having an opening in one end thereof,
    a structure including a bellows and a cap having an end wall of thermally conducting material attached to one end of the bellows, said structure being contained within the housing with the cap normally extending through the housing opening but which is moveable toward the housing opening by a force on the cap that counteracts a resilient force exerted by the bellows when compressed by such a force,
    a surface within the cap that emits electromagnetic radiation with a detectable optical characteristic that is proportional to the temperature of the cap end wall, and
    a light wave guide extending through another end of the bellows and terminating in an end positioned a distance from the radiation emitting surface but in optical communication therewith.

16. The sensor of claim 15, wherein the electromagnetic radiation emitting surface on the inside of the end wall includes a surface of a layer of luminescent material attached to an inside of the cap.

17. The sensor of claim 16, additionally including an optically transparent cover positioned within the cap over the layer of luminescent material.

18. The sensor of claim 15, wherein the electromagnetic radiation emitting surface on the inside of the end wall includes a surface of known emissivity that emits radiation within an infrared range.

19. The sensor of claim 18, wherein the surface of known emissivity includes an inside surface of the material forming the cap.

20. The sensor of claim 15, wherein the housing includes an attachment device on an outside surface thereof for removable insertion of the housing into an opening of a support plate, and said wave guide extends through an end of the housing opposite to said one end and terminating a distance from said opposite end in a manner enabling coupling of the wave guide termination to an end of an optical fiber.

21. Equipment for processing planar substrates, comprising:
 a vacuum chamber,
 a support within the vacuum chamber that is adapted to horizontally support a lower surface of at least one of the substrates at a defined plane against gravity,
 a temperature sensor carried by the substrate support and having a cap with a non-deformable planar end wall of thermally conducting material and a downwardly protruding side wall connected thereto, said cap normally extending upward above the defined plane in the absence of a substrate, said temperature sensor additionally including:
  a surface on an inside of the cap end wall that emits electromagnetic radiation having a detectable optical characteristic that is proportional to the temperature of the cap end wall,
  a light wave guide fixed with respect to the substrate support and having one end held within the cap a distance from the radiation emitting surface with a void therebetween but in optical communication therewith, and
  a resilient element connected with the cap in a manner that the cap outside surface is moved laterally and rotatably with respect to the wave guide to a position coincident with the defined plane under the weight of one of the substrates, thereby causing the cap end outside surface to firmly engage the substrate surface when positioned in contact therewith.

22. The processing equipment of claim 21, wherein the resilient element of the temperature sensor includes a spring surrounding said one wave guide end that urges the cap through an opening of a housing a distance away from said one wave guide end that is limited by a stop adjacent said housing opening.

23. The processing equipment of claim 21, wherein the resilient element is formed as part of the cap side wall.

24. The processing equipment of claim 23, wherein the cap side wall includes folds that operate to exert a force on the cap end away from the wave guide one end in response to being compressed.

25. The processing equipment of claim 21, wherein the cap side wall includes the resilient element in the form of a plurality of resilient fingers oriented at an acute angle with a normal to the cap end wall outside surface and that operate to exert a force on the cap end away from the wave guide one end in response to being pushed toward said wave guide one end.

26. The processing equipment of claim 21, wherein the electromagnetic radiation emitting surface on the inside of the end wall includes a surface of a layer of luminescent material attached to an inside of the cap.

27. The processing equipment of claim 26, additionally including an optically transparent cover positioned within the cap over the layer of luminescent material.

28. The processing equipment of claim 21, wherein the electromagnetic radiation emitting surface on the inside of the end wall includes a surface of known emissivity that emits radiation within an infrared range.

29. The processing equipment of claim 28, wherein the surface of known emissivity includes an inside surface of the cap material.

30. The processing equipment of claim 21, wherein the temperature sensor is removeably held within an aperture of the substrate support, and wherein said wave guide extends through an end of the housing opposite to an end carrying the cap and terminates a distance from said opposite end in a manner enabling coupling of the wave guide termination to an end of an optical fiber.

31. The processing equipment of claim 21, wherein the temperature sensor serves to support the substrate, the resilient element of the temperature sensor being strong enough to support the lower surface of one of the substrates at said defined plane.

32. A method of measuring the temperature of a horizontal bottom surface of a substrate, comprising:
 utilizing a vertically positioned light wave guide having an end positioned under the horizontal surface,
 providing a cap positioned over the wave guide end but held spaced apart from it by a resilient element in a manner that the cap is moveable toward the optical fiber end and with a limited amount of rotation with respect thereto when the bottom substrate surface is placed thereagainst,
 providing a surface within the cap, and in optical communication with the wave guide end, that emits electromagnetic radiation having a detectable optical characteristic that is proportional to the temperature of the cap, and
 measuring said detectable optical characteristic of radiation emitted from the cap surface at another end of the wave guide.

33. The method of claim 32, wherein providing a cap spaced apart from the wave guide end by a resilient element includes providing a resiliently compressible bellows surrounding the wave guide end with the cap integrally formed with the bellows across one end thereof.

34. The method of claim 32, wherein providing the electromagnetic radiation emitting surface includes providing a layer of luminescent material attached to an inside of the cap and measuring the detectable optical characteristic of radiation emitted from a surface thereof includes measuring a time of decay of the luminescence in response to excitation radiation.

35. The method of claim 32, wherein the resilient element provided is strong enough to support the substrate.

36. The method of claim 32, wherein the substrate being measured includes either a semiconductor wafer or a flat panel display and the temperature measuring method is occurring while the substrate is being processed.

* * * * *